United States Patent [19]
Poty et al.

[11] 3,969,013
[45] July 13, 1976

[54] THERMALLY CONTROLLED MICROSCOPE STAGE ASSEMBLY

[75] Inventors: Bernard Poty, Gondreville; Jacques Leroy, Vandoeuvre-les-Nancy; Leon Jachimowicz, Saulxures-les-Nancy, all of France

[73] Assignee: Agence Nationale de Valorisation de la Recherche (ANVAR), Neuilly-sur-Seine, France

[22] Filed: Mar. 25, 1975

[21] Appl. No.: 562,039

[30] Foreign Application Priority Data
Mar. 26, 1974 France ............................ 74.10227

[52] U.S. Cl. ................................. 350/87; 350/93
[51] Int. Cl.² ................ G02B 21/06; G02B 21/34
[58] Field of Search ........................... 350/86–90, 350/93; 73/17 A; 165/27, 61

[56] References Cited
UNITED STATES PATENTS

| | | | |
|---|---|---|---|
| 2,232,354 | 2/1941 | Weygand | 350/93 |
| 3,297,491 | 1/1967 | Kolenko | 350/93 |

FOREIGN PATENTS OR APPLICATIONS

| | | | |
|---|---|---|---|
| 457,990 | 3/1928 | Germany | 350/86 |
| 463,915 | 1/1971 | Japan | 350/86 |

OTHER PUBLICATIONS
IBM Tech. Dis. Bull., Tynan et al., vol. 17, No. 8, Jan., 1975, pp. 2507–2508.

Primary Examiner—John K. Corbin
Assistant Examiner—Jon W. Henry
Attorney, Agent, or Firm—Young & Thompson

[57] ABSTRACT

A thermally controlled microscope stage assembly for use in measuring transformation temperatures between −180° and +600°C. The stage assembly includes a thick-walled platen with a resistance heater in an annular cavity adjacent a specimen chamber and a cooling channel arranged along the periphery of the platen for, respectively, heating and cooling the specimen chamber. The platen has a lighting well disposed along the optical axis of the associated microscope. A condenser is built in the lighting bore and includes a pair of axially spaced plano-spherical fused quartz lenses both with their spherical surface facing the incident illuminating beam. The lens closer to the microscope has its plane surface, which defines its isophote plane, level with the upper surface of the platen. The specimen chamber is defined by the top surface of the platen, a thick-walled annular member seated on the platen and a thin transparent plate member. The temperature in the specimen chamber is measured by a platinum resistance probe which forms one arm of a linearizer bridge. A heating relay and a cooling relay are connected respectively in series with heating and cooling supplies and a thermostat control selectively controlling one of the relays in response to the sign of the voltage difference between the output voltage of the linearizer bridge and a set voltage determined by an adjustable voltage source corresponding to the set temperature.

15 Claims, 2 Drawing Figures

THERMALLY CONTROLLED MICROSCOPE STAGE ASSEMBLY

BACKGROUND OF THE INVENTION

The present invention relates to apparatus for measuring the temperature of an object or specimen viewed through a microscope, and more particularly to the measurment of transformation temperatures of the object or specimen. Such measurements find applications in, namely, mineralogy, petrochemistry, microchemistry, biology and biochemistry, in a temperature range of −180° to +600° C.

In order to carry out such measurements, there is generally used a thermally controlled stage or object support comprising a thick platen provided with heating and cooling means, a specimen chamber in thermal contact with the platen, the specimen chamber being provided with thermometric means. The specimen is placed in the specimen chamber which has a transparent viewing window for microscopic observations. The specimen is thus brought to the temperature prevailing in the specimen chamber, this temperature being measured by the thermometric means and regulated by adjusting the heating power furnished by the heating means for temperatures above ambient temperature or the cooling power by cooling means for temperatures below ambient temperature. The thermometric means obviously must be able to measure very accurately the temperature in the relevant operating range, and the thermosensitive element associated with the thermometric device must not markedly affect the temperature taken in the specimen chamber.

Mercury thermometers having suitable accuracy in their working range are frequently used.

For diascopic lighting of the specimen, the platen is provided with a lighting well superposing a transparent specimen supporting plate in the specimen chamber. The condenser of the microscope penetrates into the lighting well so as to concentrate the illuminating beam on the specimen being observed.

For displacing the specimen in the viewing field of the microscope, the specimen chamber is generally provided with a mchanism for imparting translatory motion on the transparent specimen supporting plate, this mechanism comprising micrometric screws acting in two mutually perpendicular directions on the mounting of the transparent specimen supporting plate.

The heating means for the platen is usually a resistance heater embedded in the platen and supplied by an adjustable power supply means through an adjustable autotransformer. The cooling means is very often a passageway in the platen for carrying a coolant, for example, water or carbon dioxide expanded from its pressurized liquid state.

According to other known setups, the thermally controlled specimen holder or stage does not enable accurate temperature measurements in a wide range. At temperatures substantially remote from ambient temperature, the flow of energy between the platen and the chamber gives rise to temperature gradients which introduce errors in the measurements, particularly when the temperature changes rapidly, because the differences between the temperatures read and the temperature of the specimen are a function of the direction and the rate of change and, therefore, cannot be compensated for by a simple conversion. At high temperatures the heating of the optical and mechanical parts of the setup creates difficulties; the frosting of the optical elements by condensation of water vapor from the surroundings and the freezing of the cooling pipes interfere with low temperature operation. In fact, with known thermally controlled specimen holders for thermometric microscopic observations, the working temperature range is between −20°C and +350°C, but the accuracy of readings at the extreme limits of this range is poor.

SUMMARY OF THE INVENTION

An object of the present invention is to provide a thermally controlled microscope stage assembly enabling accurate and convenient measurements of temperatures in the range of −180° to +600°C.

Another object of the thermally controlled microscope stage assembly is the provision of thermostat controlled means for heating and cooling.

A further object of the invention is the provision of a substantially constant temperature specimen chamber.

The thermally controlled microscope stage assembly according to the invention enables the measurement of transformation temperatures between −180°C and +600°C of a test sample or specimen viewed through a microscope and lighted by a lamp, comprising a thick platen having means for heating and cooling, a lighting well along the optical axis of the microscope, a light beam condenser built in the lighting well and having a planar frontal surface, forming the isophote plane, level with the platen, a specimen chamber having one side formed by the platen, a thick lateral wall in good thermally conductive relation with the platen and a transparent window facing the lighting bore, thermometric means comprising a resistance probe in one arm of a linearizer bridge, and voltage measuring means at the output of the bridge, the probe being embedded in the platen proximate to said one side of the chamber, heating relay means and cooling relay means respectively connected to associated means, and thermostat control means for selectively controlling one of the heating and cooling relay means in response to the sign of the voltage difference between the output voltage of the bridge and a set voltage from a variable voltage source.

Preferably, the condenser comprises two planospherical lenses of fused quartz, the downstream side of the second lens relative to the path of the illuminating beam being frusto-conical with an apex half-angle of 30° and its minor base level with the top surface of said platen.

Preferably, the platen is a body of revolution about a substantially vertical axis coinciding with the optical axis of the associated microscope. The upper planar surface of the platen supports a thick annular member defining the lateral wall of the specimen chamber, the diameter of the specimen chamber being at most two-fifths of the outer diameter of the annular member. The means for heating is a resistance heater embedded in an annular cavity in the platen, and the means for cooling is an annular peripheral channel through which a cooling fluid flows.

The thermostat advantageously comprises two threshold triggering circuits respectively controlling the heating relay means and the cooling relay means in response to the sign of the voltage difference between the output voltage and set voltage.

The features and advantages of the invention will be brought out in the description which follow, by way of example, with reference to the accompanying drawings.

DETAILED DESCRIPTION OF THE PREFERRED EMBODIMENT

Figure 1:
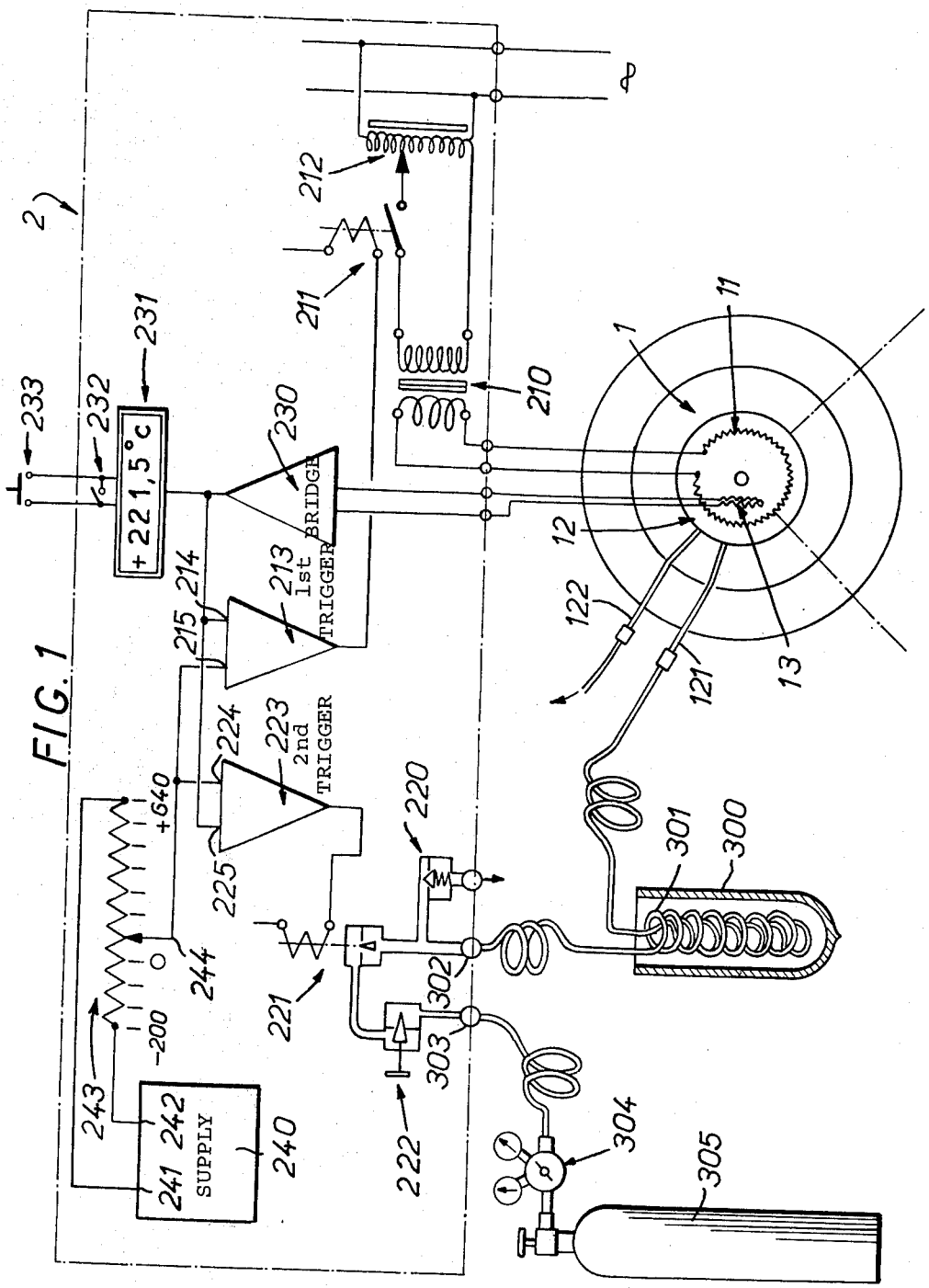
FIG. 1 schematically illustrates the entire setup of the thermally controlled microscope stage assembly according to the invention.

In the overall arrangement schematically illustrated in FIG. 1, the numeral 1 designates the specimen holder per se which will be described hereinbelow in greater detail. For the time being suffice it is to say that the specimen holder 1 comprises means for heating which is a resistance heater 11 and means for cooling 12 which is a peripheral channel with an inlet nozzle or orifice 121 and an outlet nozzle or orifice 122. The platinum resistance probe 13 is embedded in the platen and constitutes a thermosensitive element for measuring the temperature in the specimen chamber.

A control unit 2 groups together the platen temperature control and temperature measuring equipment. The power supply for the resistance heater 11 comprises an autotransformer 212 adapted to the characteristics of the resistance heater 11 and having an adjustable tap for regulating the power input, and a relay 211 which opens the circuit between the autotransformer 212 and the transformer 210 when its winding is energized.

The cooling control system inside the control unit 2 comprises a gas inlet tube 303, a needle valve 222, an electrically controlled valve 221 which closes when its control coil is energized and a gas outlet tube 302. In parallel across the outlet 302 is a calibrated escape valve 220 which brings the tube 302 into communication with the ambient atmosphere in case of overpressure.

The supply of cooling gas under pressure is provided by a tank 305 of dry nitrogen with an expander 304. A heat exchanger consisting of a coiled tube 301 is interconnected between the outlet tube 302 and the inlet nozzle or orifice 121. The coiled tube 301 is disposed inside an insulated container 300 containing nitrogen, maintaining it in its liquid state. The container 300 is a double-walled container known as a Dewar flask.

The control unit further comprises a linearizer bridge 230 one arm of which consists of the platinum resistance probe. The bridge 230 is of a type known per se and is provided with power supply and an output amplifier so that the unbalanced voltage is proportional to the temperature in centigrade measured by the probe 13. The output voltage is connected to a digital voltmeter, known per se, provided with automatic polarity switching and display of polarity. In a conventional manner the voltmeter takes a sample measurement and displays the value thereof. The voltage sampling may be carried out, depending on the position of the switch 232, repeatedly or in response to the actuation of the control switch 233.

The output voltage of the bridge 230 is applied to the positive input lead 214 of a first differential threshold triggering means 214 and to the negative input lead 225 of a second differential threshold triggering means 223.

The negative input lead 215 of the first triggering means 213 and the positive input lead 224 of the second triggering means 223 are connected in common to the slide contact 244 of the potentiometer 243 for displacing the set voltage. The potentiometer 243 is supplied by a power source 240 providing a negative voltage at its output lead 242 and a positive voltage at its other output lead 241.

Figure 2:
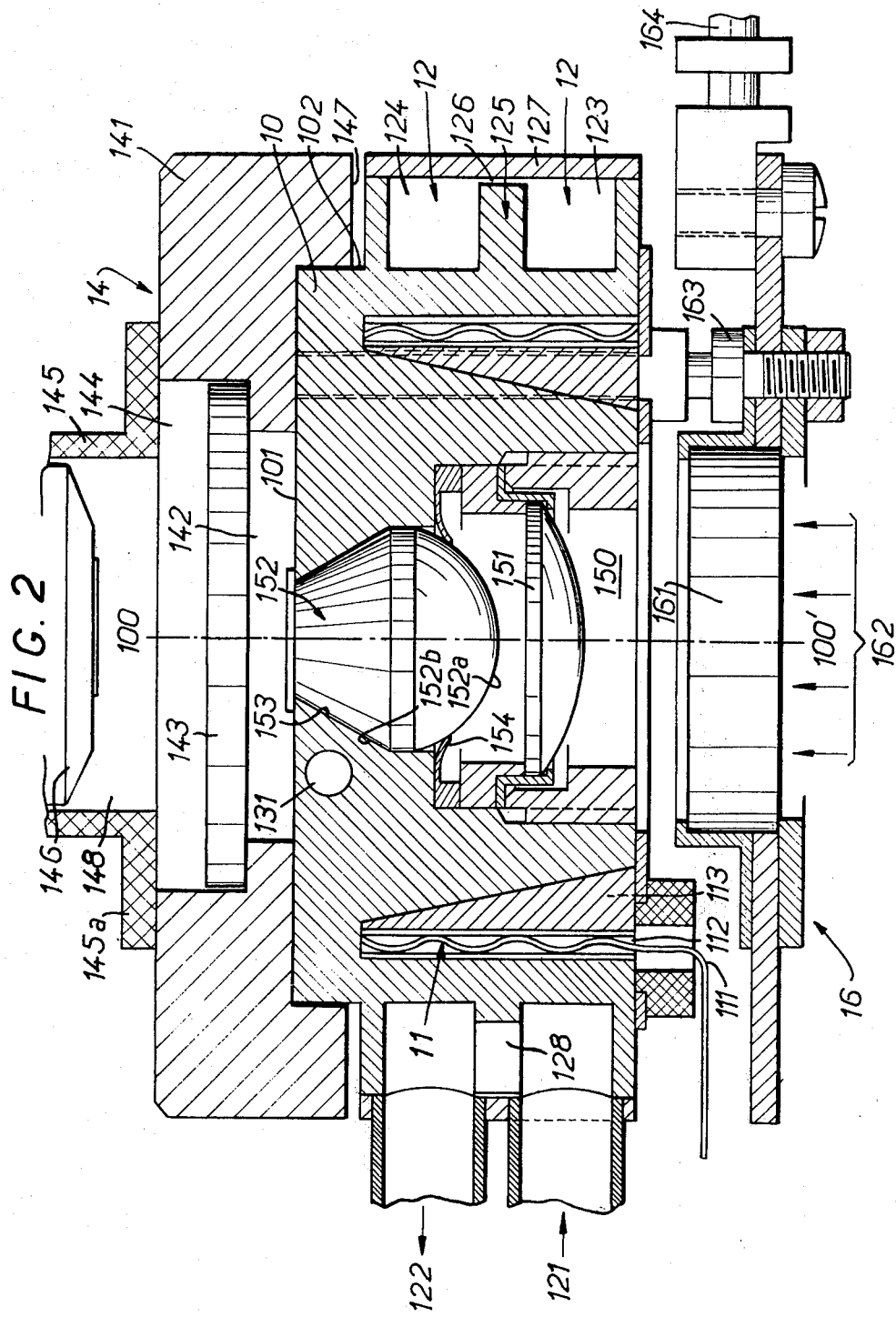
FIG. 2 is a vertical sectional view of the microscope stage per se without the heating and cooling supply means or the control unit and shown at four times actual scale.

The specimen holder per se is illustrated in FIG. 2 and has a vertical axis of symmetry 100–100'. The substantially hollow cylindrical platen 10 has a planar top surface 101 and an annular recess 112 housing the part-circular resistance heater 11 held in place therein by an annular tapered plug 113. The wire leads 111 for supplying the resistance heater 11 are connected to the transformer 210 as shown in FIG. 1.

A cooling channel 12 comprises two grooves 123 and 124 axially spaced and separated by a outwardly protruding partition 125. A sleeve 127 closes off the grooves peripherally but is spaced from the outer periphery of the partition 125 by a narrow gap 126. The inlet nozzle 121 runs into the lower groove 123 and the outlet nozzle 122 communicates with the upper groove 124. The grooves 123 and 124 communicate with each other through an interconnecting port 128 in the portion of the partition 125 between the nozzles 121 and 122. The staggered arrangement of the inlet and outlet orifices of the grooves necessitates the flow of gas successively and uniformly through both grooves 123 and 124.

The specimen chamber generally designated by reference numeral 14 has its bottom surface defined by the planar top surface 101 of the platen. The side wall of the chamber 14 is formed by a thick annular member 141 with a central aperture 142. The diameter of the central aperture 142 is about two-fifths of the outer diameter of the annular member 141. The annular member 141 is seated on the upper surface 101 of the platen, and the depending flange 147 is shaped complementary to the shoulder 102 of the platen but out of contact therewith. The upper surface 101 of the platen and the surface of the annular member 141 in contact therewith are precision machined so that thermal conduction is as great as possible. The end surface of the depending flange 147 is out of contact with the shoulder 102 in order to avoid thermal conduction therebetween. The specimen chamber 14 is closed at its upper end by a thin transparent plate member of fused quartz with optically precision parallel faces. The plate member 143 is disposed in a recess 144 extending two-thirds the way through the thickness of the annular member 141. The objective 146 of the microscope focuses on the specimen through the thin transparent plate member 143. A tubular screening member 145 in moderate sliding friction contact with the objective 146 of the microscope is supported by its flange 145a on the annular member 141 thereby defining with the recess 144 an intermediate chamber 148.

The resistance probe 13 is inserted in a cavity 131 in the platen 10 in the immediate vicinity of the upper planar surface 101 below the aperture 142 in the annular member 14.

A lighting well 150 is disposed along the vertical axis 100–100' and terminates at its upper end in a frustoconical portion 153 having an apex half-angle of 30°. A light condenser is built in the lighting well and comprises two plano-spherical lenses 151 and 152 of fused quartz. The first lens 151 is of conventional configuration and receives the incident illuminating beam 162 along its spherical surface. The first lens is held in place between conventional tubular lens supports. The second lens 152, on the other hand, is comprised of a spherical nose 152a extending over nearly 120° with a tapered frusto-conical tail portion 152b complementary in shape to the frusto-conical bore 153 formed in the platen 10. An elastic diaphragm 154 urges the tail portion 152b against the complementary frusto-conical bore 153. The planar surface of the second lens 152, corresponding to the minor base of the frustum, is level with the upper planar surface 101 of the platen 10. Owing to the engagement of the frusto-conical tail portion 152b in the frusto-conical bore 153 and the force applied by the elastic diaphragm urging the frusto-conical tail into engagement with the complementary frusto-conical bore, the second lens 152 cannot be displaced in response to differential expansions and contractions of the platen and the lens 152 caused by temperature variations. Because of the thickness of the lens 152 relative to the radius of curvature of the spherical nose 152a, the image formed by this lens is inside the lens. The curvature of the sperical surface of the lens 151 and the spacing between the lenses are calculated so that the planar surface of the lens 152 is in the so-called isophote plane of the condenser, the isophote plane of a condenser being the plane in which the light density is constant. The reason therefor is the fact that each point in this plane receives light from all the points of the illuminating beam; in other words, the image of the light source is totally fuzzy.

The entire assembly just described is supported on a frame generally designated by reference 16 by means of low thermally conductive feet 163. The frame includes a filter 171 for eliminating infra-red radiation from the illuminating beam 162. Micrometric adjusting means 164 are provided for displacing the frame 16 with the rest of the assembly relative to a base (not shown) in two mutually perpendicular directions.

The accuracy of the temperature measurements of the specimen at a given moment implies that the temperature is substantially uniform in the specimen chamber 142 and equal to the temperature detected by the probe 13 in the cavity 131. The thermal distribution is nearly perfectly uniform about the axis of symmetry of the platen which is only very slightly affected by the poor thermally conductive feet 163. Radial gradients are very greatly diminished by the fact that lateral surface of the platen 10 is thermally insulated from the sleeve 127 by the cooling channel 12, the thermal conduction being broken by the gap 126 between the partition 125 and the sleeve 127. Moreover, since the condenser 151,152 is built in the platen 10, it is at the same temperature as the platen and does not have another thermally conductive path to the surroundings. The illuminating beam 162 introduces only very small amounts of heat along the axis as the infra-red is blocked out by the filter.

The longitudinal temperature gradient is reduced by favoring longitudinal conduction from the means for heating and cooling to a point beyond the specimen chamber 142. The annular tapered plug 113 increases the resistance to heat flow in the radial direction in the lower part of the platen. In cooling, the cooling fluid in the lower groove 123 of the cooling channel 12 does not create an inversion of the temperature gradient in the upper groove 124. The annular member 141 is in good thermal conductive relation with the upper surface 101, however, the flange 147 does not bear against the shoulder 102 so that the heat flow is substantially normal to the surface 101', therefore, the lateral wall of the specimen chamber 142 is substantially isothermal. Accordingly, a specimen placed in the specimen chamber 142 is in a closed chamber at a substantially uniform temperature. The importance of the ratio of the diameter of the chamber 142 to the diameter of the annular member 141 was clearly illustrated during trials with annular member having an outer diameter bearing the ratio of 2/1 to the diameter of the chamber (instead of ratio 2.5/1) when unacceptable temperature gradients appeared in the specimen chamber. The heat losses through the thin transparent plate member are reduced by the low thermal conductivity of quartz and the reduction of convection losses above the thin transparent plate member by the tubular screening member 145. This reduction of convection losses is especially desirable at low temperatures when it prevents the frosting of the thin transparent plate member 143 since condensation of frost can remove considerable amounts of available energy.

It will be noted that the optical elements, consisting of the lenses 151 and 152 and the thin transparent plate member 142, are all optically polished fused quartz elements. In fact quartz optical elements withstand temperatures greater than 600°C without deformation or damage, and its very low coefficient of expansion allows it to withstand abrupt variations of temperature and thermal shocks.

Rapid temperature variations are another cause of development of large temperature gradients. Nevertheless, it is essential to be able to reach a given working temperature range rapidly, even if the zone is far from ambient temperature. With this result in mind, the heating power is effectively adjustable by the autotransformer 212 and the cooling power is controlled by precision adjustment of the flow of nitrogen in the coiled tube 301 by means of the needle valve 222. Normally, the heating or cooling regulation is such that the equilibrium temperature in centigrade is slightly greater in absolute value than the working temperature. The regulation of the working temperature is then obtained by means of a thermostat functioning as described hereinafter.

Each of the differential threshold triggering means 213 and 214 comprises, as is known per se, a differential amplifier having an positive input lead, a negative input lead and an output lead connected across a feedback loop controlled at the negative input lead and through a second feedback loop including an input threshold at the positive input lead. It follows that the output current of the amplifier remains low as long as the algebraic difference between the voltages at the positive and negative inputs is less than a threshold value, but when this difference in the input voltages is greater than the threshold voltage, the output voltage jumps to a saturation value.

The displayed set voltage corresponds to the position of the contact slide 244 of the potentiometer 243 and is equal to the output voltage of the bridge for the set temperature corresponding to the position of the contact slide. Owing to the reversed connection of the respective inputs of the differential triggering means 213 and 223, when the temperature measured by the probe 13 is less than the set temperature, the triggering means 223 will energize the electrically controlled valve 221 closing the flow of cooling fluid. When the temperature measured is greater than the set temperature, the triggering means will cause the actuation of the relay means 211 which cuts off the flow of heating fluid. When the measured temperature is equal to the set temperature or in a narrow range around the set temperature the relay means 211, and owing to the thresholds, the electrically operated valve 221 will be energized simultaneously and the heating and the cooling will be cut off simultaneously. The neutral zone around the set temperature can be controlled by adjusting the thresholds.

It is obvious that, for working temperatures greatly above ambient temperature, the cooling means may be cut out by closing the needle valve 222 and the expander 304. Likewise, for working temperature greatly below ambient temperature, the heating means may be cut out. It is therefore only in the vicinity of ambient temperature that the heating and cooling means will both be operative at low heating and cooling values, the thermostat actuating one or the other of the heating and cooling means as required.

The display of the measured temperature on the digital voltmeter will be put on the repeating mode by closing the switch 232 during the initial rapid temperature change phase so that the operator is able follow the change in temperature towards the desired range. In order to measure a transformation temperature, the switch 232 will be open. Accordingly, the voltmeter will display the temperature measured by the probe upon each actuation of the switch 233 and until the switch 233 is once again actuated, unless switch 232 is closed, in which case the probe temperature will be automatically displayed anew at given intervals.

The thermally controlled microscope stage assembly described hereinabove has given the following performance:
Working temperature range: −180° to +600°C
Accuracy: ± 0.01°C between −120°C and +120°C
± 0.1°C below 120° to −180°C and above 120° to +600°C
Time for reaching the lowest temperature (−180°C): 6 min.
Vertical temperature gradient in the specimen at 400°C: 0.8°C/mm Mean radial temperature gradient in the specimen chamber at 400°C: 1.5°C/mm The invention is of course not limited to the described example but embraces all variations, modifications and alternatives within the scope of the appended claims.

What we claim is:

1. A thermally controlled microscope stage assembly for use in measuring transformation temperatures between −180° and +600°C, comprising a thick-walled platen with means for heating and means for cooling a specimen, a lighting well extending through said platen so as to be along the optical axis of the objective of a microscope associated therewith, a condenser for an illuminating beam built in said lighting well, the surface of the condenser facing the objective of the microscope containing the isophote plane of the condenser and lying level with the top surface of said platen, a specimen chamber bounded along its bottom by said platen, along its sides by a thick lateral wall in thermal contact with said platen, and along its top by a thin transparent platen member, heating supply means and cooling supply means for supplying respectively said means for heating and cooling the specimen, thermometric means including a resistance probe disposed in said platen adjacent the bottom of said specimen chamber and voltage measuring means, said resistance probe forming one arm of a linearizer bridge, heating relay means and cooling relay means connected respectively in series with said heating supply means and said cooling supply means and thermostat control means, said thermostat control means selectively controlling one of said relay means in response to the sign of the voltage difference between the output voltage of said linearizer bridge and a set voltage, said set voltage being provided by an adjustable voltage source and corresponding to a desired set temperature.

2. A microscope stage assembly according to claim 1, wherein said condenser comprises two fused quartz plano-spherical lenses both arranged with their spherical surfaces facing the incident illuminating beam, the second of said lenses along path of the illuminating beam therethrough terminating in a frusto-conical tail portion of which the minor base is said surface of the condenser facing the objective of the microscope.

3. A microscope stage assembly according to claim 2, wherein the frusto-conical tail portion of the second lens has a 30° apex half-angle, said frusto-conical tail portion being fitted into a complementary frusto-conical surface in said lighting well.

4. A microscope stage assembly according to claim 2, wherein said platen is formed as a body of revolution with a vertical axis substantially coinciding with the axis of said lighting bore, and wherein said thick lateral wall is defined by an annular member bearing on the top surface of said platen, the diameter of said specimen chamber being at most two-fifths of the outer diameter of said annular member.

5. A microscope stage assembly according to claim 4, wherein said means for heating is a resistance heater arranged in an annular cavity in said platen, and said means for cooling is an annular channel at the periphery of said platen for the flow of cooling fluid therethrough.

6. A microscope stage assembly according to claim 5, wherein said annular channel is comprised of at least two axially spaced grooves separated by at least one partition but communicating by means of staggered orifices extending through the partition, and of an outer sleeve with a cooling fluid inlet orifice and a cooling fluid outlet orifice, said sleeve closing said channel peripherally but out of contact with said partition.

7. A microscope stage assembly according to claim 5, wherein said annular member has a depending peripheral flange extending around said platen but out of thermal conductive relation therewith.

8. A microscope stage assembly according to claim 5, further comprising a tubular screening member adapted to be in moderate sliding friction contact with the objective of the microscope and having a flange bearing on said annular member.

9. A microscope stage assembly according to claim 5, wherein the cooling fluid is a gas under pressure; said cooling supply means is a source of gas under pressure; and said cooling relay means is an electrically controlled valve which is followed by a heat exchanger and disposed between said source of gas under pressure and said means for cooling said platen; further comprising a needle valve for adjusting the flow of gas to said means for cooling when the electrically controlled valve is open.

10. A microscope stage assembly according to claim 9, wherein said heat exchanger is a tubular coil immersed in liquified gas contained in a thermally insulated container.

11. A microscope stage assembly according to claim 10, wherein the gas of said source of gas under pressure is nitrogen at less than about 1 bar relative pressure, and said liquified gas is liquified nitrogen.

12. A microscope stage assembly according to claim 1, further comprising a frame for supporting said platen including low thermally conductive feet, said frame having micrometric means for the translation of said platen in mutually perpendicular directions.

13. A microscope stage assembly according to claim 12, wherein said frame has a recess aligned with said condenser, a filter being disposed in said recess for eliminating infrared rays from the incident illuminating beam before it enters said lighting well.

14. A microscope stage assembly according to claim 1, wherein said resistance probe produces a voltage proportional to the temperature in centigrade measured thereby, wherein voltage measuring means is a digital voltmeter, and wherein said thermostat control means comprises a first threshold triggering means for energizing said heating relay means in response to the difference between the output voltage of said bridge and the set voltage, and a second threshold triggering means controlling said heating relay means in response to the difference between the set voltage and the output voltage of said bridge.

15. A microscope stage assembly according to claim 3, further comprising elastic diaphragm means urging said tail portion against said complementary frusto-conical surface.

* * * * *